(12) United States Patent
Kao

(10) Patent No.: US 8,294,827 B2
(45) Date of Patent: Oct. 23, 2012

(54) WHITE BALANCE CORRECTION METHOD

(75) Inventor: Hsu-Pin Kao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 312 days.

(21) Appl. No.: 12/757,052

(22) Filed: Apr. 9, 2010

(65) Prior Publication Data

US 2010/0259686 A1 Oct. 14, 2010

(30) Foreign Application Priority Data

Apr. 13, 2009 (CN) .......................... 2009 1 0301523

(51) Int. Cl.
H04N 9/68 (2006.01)

(52) U.S. Cl. ...................................... 348/655

(58) Field of Classification Search .................. 348/655, 348/656, 658, 657, 223.1, 659–661, 225.1; 358/1.9, 504, 2.1; 345/589–605
See application file for complete search history.

(56) References Cited

U.S. PATENT DOCUMENTS

| | | | | |
|---|---|---|---|---|
| 4,658,286 | A * | 4/1987 | Schwartz et al. ............. | 348/179 |
| 7,265,794 | B2 * | 9/2007 | Bellis et al. .................... | 348/655 |
| 7,583,403 | B2 * | 9/2009 | Ito et al. ......................... | 358/1.9 |
| 7,586,498 | B2 * | 9/2009 | Park et al. ...................... | 345/593 |
| 7,742,057 | B2 * | 6/2010 | Ou-Yang et al. .............. | 345/589 |
| 8,035,697 | B2 * | 10/2011 | Onomura ..................... | 348/223.1 |
| 2008/0018735 | A1 * | 1/2008 | Aizaki et al. ..................... | 348/79 |
| 2008/0024528 | A1 * | 1/2008 | Han et al. ....................... | 345/690 |

FOREIGN PATENT DOCUMENTS

CN 101350885 A 1/2009

* cited by examiner

Primary Examiner — Paulos Natnael

(74) Attorney, Agent, or Firm — Altis Law Group, Inc.

(57) ABSTRACT

A method for correcting the white balance of a display by: setting a target color coordinates of a target white point of a target white point plane at a predetermined color temperature and a group of gray levels as the input gray levels in response to a user input command; constructing a white color image according to the group of the gray levels; measuring luminance and color coordinates of a measured white point of the white color image; estimating luminance of the R, G, B based on the standard color coordinates defined in a standard color space, the measured luminance and color coordinates of the measured white point; estimating gray levels of the R, G, B based on the estimated luminance of the R, G, B; and reconstructing the Gamma table based on the estimated adjusted gray levels of the two adjustable colors.

18 Claims, 6 Drawing Sheets

WHITE BALANCE CORRECTION METHOD

BACKGROUND

1. Technical Field

The present disclosure relates to a technique for setting display parameters, and particularly to a white balance correction method for a display.

2. Description of Related Art

Usually when setting the white balance of a display, a user will manually adjust the intensity of the red, green, and blue color components of the display by using a colorimeter and a color-difference meter. That is, settings are done manually using the user subjective judgment to adjust the colors using the color image on the screen and the reference color data provided by the colorimeter and color-difference meter.

However, it is difficult or at least troublesome to adjust white balance by using the above mentioned method.

Therefore, a simple white balance correction method is desired.

BRIEF DESCRIPTION OF THE DRAWINGS

Many aspects of the embodiments can be better understood with reference to the following drawing. The vector components in the drawing are not necessarily drawn to scale, the emphasis instead being placed upon clearly illustrating the principles of the present embodiments.

DETAILED DESCRIPTION

Figure 1:
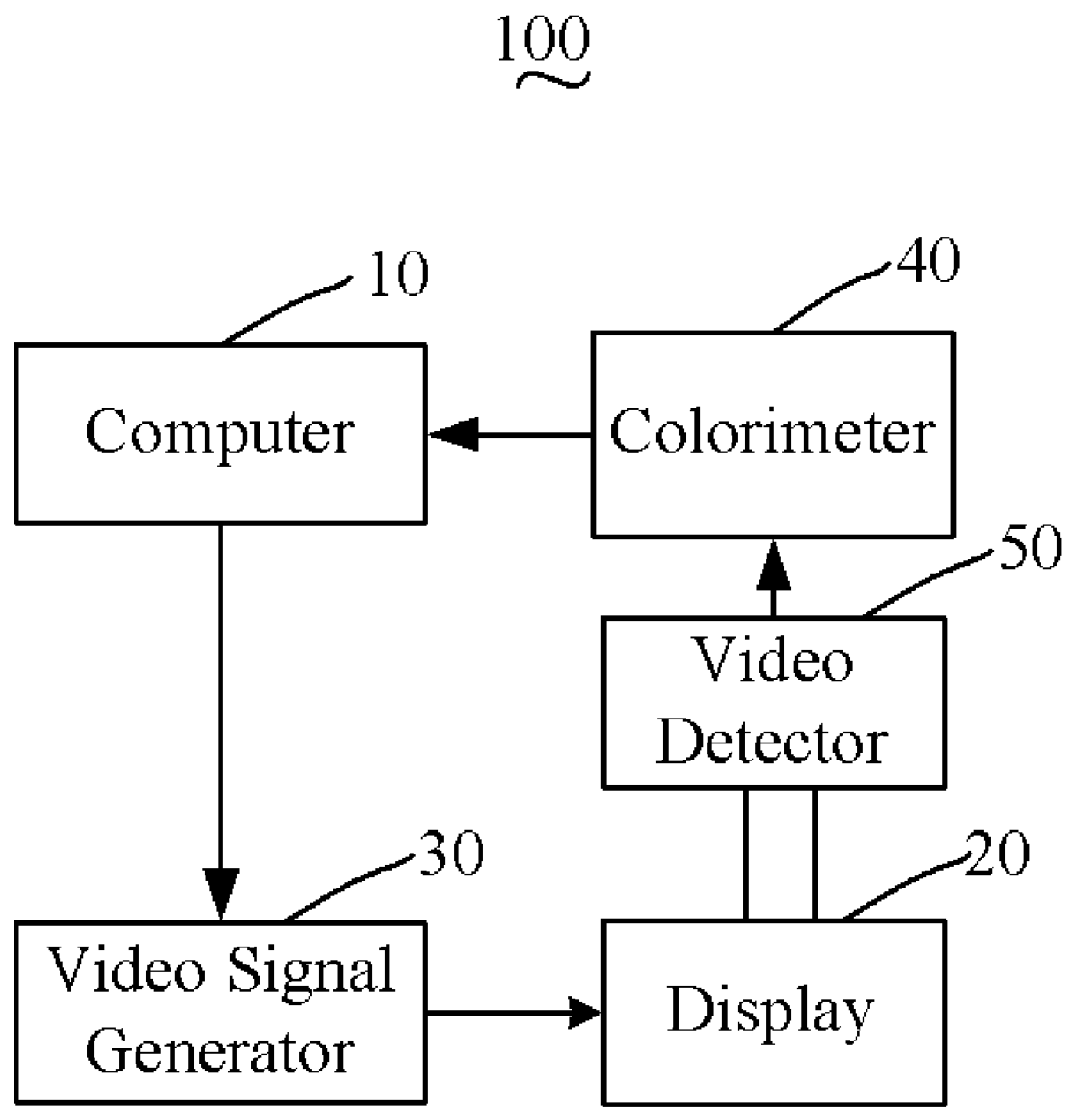
FIG. 1 illustrates a white balance correction system in accordance with an exemplary embodiment.

Referring to FIG. 1, a white balance correction system 100 is shown in accordance with an exemplary embodiment. The white balance correction system 100 includes a computer 10, a display 20, a video signal generator 30, a colorimeter 40, and a video detector 50. The display 20 may be a Television (TV) or a monitor.

The computer 10 is configured to perform a white balance correction method to control the video signal generator 30 and the colorimeter 40. For example, under the control of the computer 10, the video signal generator 30 generates RGB signals having pre-determined gray levels ranging from 0 to 255 as input to the display 20. For example, to check performance of white image output of the display, an RGB signal comprising gray levels of the RGB component at a ratio of 1:1:1, such as (255,255,255), is sent to the display 20 and white image parameters measured. The output of the display 20, in other words the image formed, is examined for gray levels which are then compared to the input levels and appropriate corrections made. An original Gamma table is pre-set in the display 20, for storing corrective action associated with relationships between input gray levels and output gray levels of the display 20. Under the control of the computer 10, the colorimeter 40 measures a white point of the white image to obtain luminance (or brightness) and coordinates of the white point and then transmits the measured luminance and the measured coordinates to the computer 10.

Based on the measured luminance and coordinates, the computer 10 is further configured to perform the white balance correction method by calculating adjusted gray level settings of the display 20 to achieve the correct output, that is, an image displayed matching the image input. The adjustments required are used to complete the Gamma table of the display 20, as a result the display 20 can maintain an output image with an optimum gray level white balance to reduce color deviation and display colors of the image close to the actual original color. For example, gray levels of a displayed red image may be (243, 0, 5) instead of the input (255, 0, 0), and after adjustments are calculated, the internal settings of the display 20 may need to be set to (215, 0, 12) to achieve an output of (255, 0, 0) and are associated in the Gamma table as such. In other words the Gamma table is used to record how to adjust the response of the display 20 to input signals to achieve desired output signals.

Figure 2:
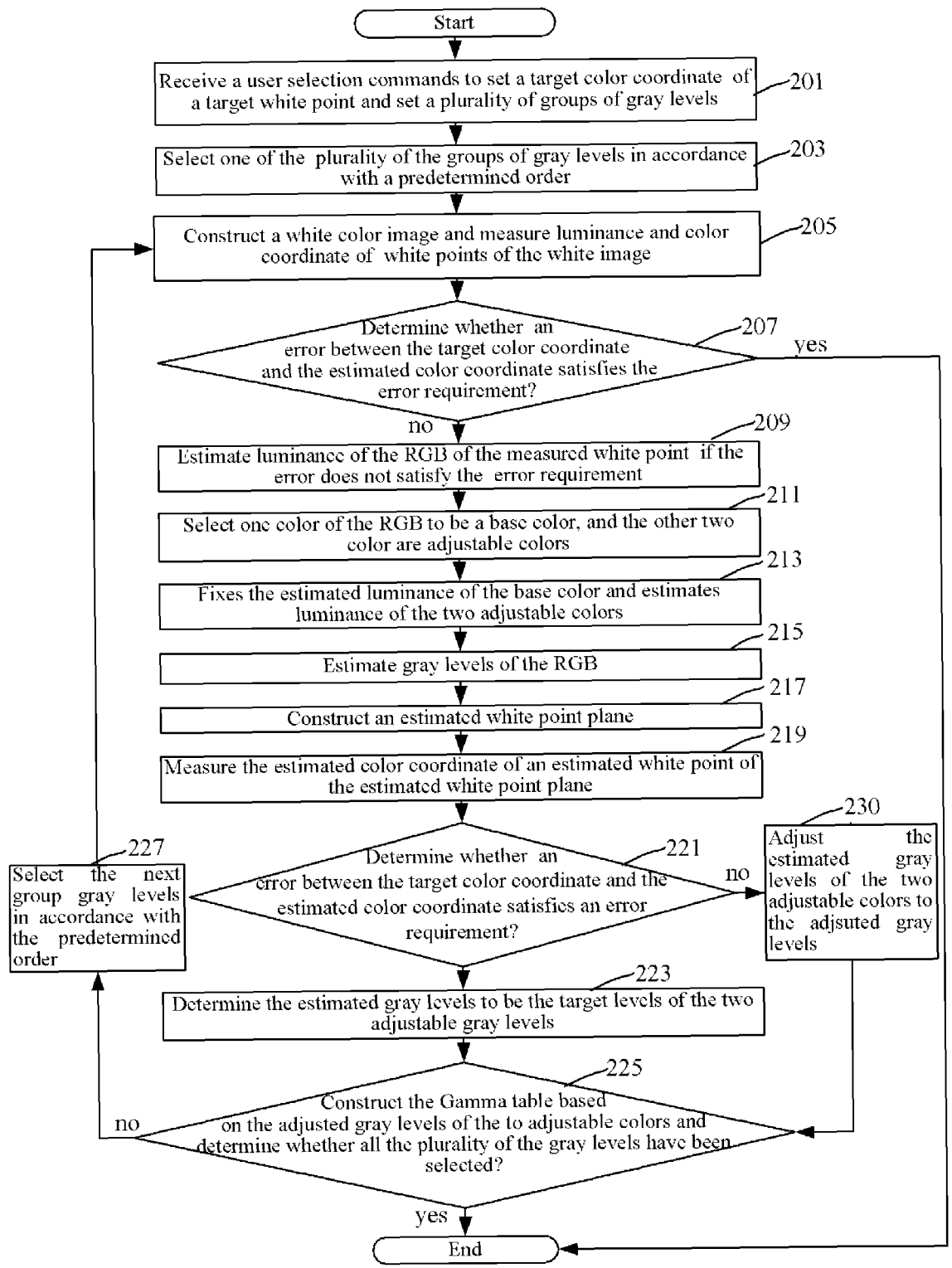
FIG. 2 illustrates a flowchart of white balance correction method in accordance with an exemplary embodiment.

Referring to FIG. 2, a flowchart of a white balance correction method is shown in accordance with an exemplary embodiment. In this embodiment, the white balance correction method is stored within the computer 10 as software. In another embodiment, the white balance correction method is configured within the computer 10 as a firmware on a chip. The white balance correction method includes the following steps.

In step 201, the computer 10 receives a user selection command manually to set a target color coordinates $W_T(x_T, y_T)$ of a target white point of a target white point plane and sets a plurality of gray level groups. The $W_T(x_T,y_T)$ is for various color temperatures. For example, in the CIE-XYZ color space, when the color temperature is 9300K, the computer 10 sets the color coordinates of the target white point to $W_T$ (0.285,0.293). Each group of gray levels corresponds to an input white image. For example, three groups gray levels, corresponding to three white images, such as "$GLr_0, GLg_0, GLb_0$", "$GLr_0^1, GLg_0^1, GLb_0^1$", and "$GLr_0^2, GLg_0^2, GLb_0^2$", are set. The ratio of each group of gray levels of the RGB components is 1. For example, values of $GLr_0:GLg_0:GLb_0$ are set at a ratio of 1:1:1, $GLr_0^1:GLg_0^1:GLb_0^1$ values are 1:1:1, and $GLr_0^2:GLg_0^2:GLb_0^2$ values are 1:1:1. The gray levels groups' number also can be reduced or increased based on requirements of the white balance precision. For example, when more gray levels are set, the better white balance achieved, but at a cost of more time.

In step 203, the computer 10 selects one of the plurality of groups of gray levels in accordance with a predetermined order. In this embodiment, the predetermined order is "$GLr_0, GLg_0, GLb_0$", "$GLr_0^1, GLg_0^1, GLb_0^1$", and "$GLr_0^2, GLg_0^2, GLb_0^2$". In other words, the computer 10 first selects the group of gray levels "$GLr_0, GLg_0, GLb_0$".

In step 205, the computer 10, controls the video generator 30 to generate an RGB signal comprising the selected group of gray levels to form a white color image on the display 20, and controls the colorimeter 40 to measure luminance and color coordinates of a white point of the white image via the video detector 50. For example, the measured luminance is $L_v$ and the measured color coordinates are (x,y).

In step 207, the computer 10 calculates an error $\Delta xy$ between the color coordinates (x,y) of the white color image and the target color coordinates $(x_T,y_T)$ of the target white point, and determines whether the error satisfies an error requirement. The error is expressed as:

$$\Delta xy = \sqrt{(x_T-x)^2+(y_T-y)^2} \quad (1)$$

In step 209, if the error Δxy does not satisfy the error requirement, the computer 10 estimates luminance $m_1$, $m_2$, $m_3$ of the R, G, B of the white color image based on standard color coordinates defined in standard color space, and the measured luminance $L_v$ and the measured color coordinates (x,y) of the white color image. The standard color space may be any one of SMPTE, EBU, PAL, SECAM, NTSC, and so on. The $m_1$, $m_2$, $m_3$ can be obtained by expressions (2)~(6)

$$m_1 = \frac{lv}{k_2 + k_3 + 1}; \quad (2)$$

$$m_2 = m_1 \times k_2; \quad (3)$$

$$m_3 = m_1 \times k_3; \quad (4)$$

$$k_2 = \frac{y_2}{y_1} \times \frac{\frac{x-x_1}{x-x_3} - \frac{y-y_1}{y-y_3}}{\frac{y-y_2}{y-y_3} - \frac{x-x_2}{x-x_3}}; \quad (5)$$

$$k_3 = \frac{y_3}{y_1} \times \frac{\frac{x-x_1}{x-x_2} - \frac{y-y_1}{y-y_2}}{\frac{y-y_3}{y-y_2} - \frac{x-x_3}{x-x_2}} \quad (6)$$

Wherein $(x_1, y_1)$, $(x_2, y_2)$, $(x_3, y_3)$ are R, G, B coordinates defined in the standard color space. For example, the $(x_1, y_1)$, $(x_2, y_2)$, $(x_3, y_3)$ values are (0.640,0.330), (0.290, 0.600), (0.150,0.060) in the EBU color space.

In step 211, the computer 10 selects one color of the R, G, B as a base color, and the other two colors are adjustable colors.

In step 213, the computer 10 fixes the gray level of the base color and re-estimates luminance of the two adjustable colors based on the estimated luminance of the base color and standard color coordinates. In other words, the adjustment of the base color is complete, and the adjustments of the adjustable colors are needed. For example, the red color R is selected to be the base color, the adjustment of gray level of the based color R is complete, and the adjustment of the gray levels of the two adjustable colors, such as the green color G and the blue color B need to be adjusted by estimating the target luminance of the two adjustable colors G and B. The luminance $m_2^1$, $m_3^1$ of the two adjustable colors G and B can be estimated based on $m_1$ and the color coordinates $(x_1, y_1)$, $(x_2, y_2)$, $(x_3, y_3)$ of the R, G, B defined in the EBU color space according to expressions (7) and (8).

$$m_2^1 = \frac{m_1 y_2}{y_1} \times \frac{\frac{x_T-x_1}{x_T-x_3} - \frac{y_T-y_1}{y_T-y_3}}{\frac{y_T-y_2}{y_T-y_3} - \frac{x_T-x_2}{x_T-x_3}} \quad (7)$$

$$m_3^1 = \frac{m_1 y_3}{y_1} \times \frac{\frac{x_T-x_1}{x_T-x_2} - \frac{y_T-y_1}{y_T-y_2}}{\frac{y_T-y_3}{y_T-y_2} - \frac{x_T-x_3}{x_T-x_2}} \quad (8)$$

Likewise, if green color G is determined to be the based color, the luminance $m_1^1$, $m_3^1$ of red color R and blue color B can be estimated based on $m_2$ and the color coordinates $(x_1, y_1)$, $(x_2, y_2)$, $(x_3, y_3)$ of the R, G, B defined in the EBU color space according to the expressions (9) and (10).

$$m_1^1 = \frac{m_2 y_1}{y_2} \times \frac{\frac{x_T-x_2}{x_T-x_3} - \frac{y_T-y_2}{y_T-y_3}}{\frac{y_T-y_1}{y_T-y_3} - \frac{x_T-x_1}{x_T-x_3}} \quad (9)$$

$$m_3^1 = \frac{m_2 y_3}{y_2} \times \frac{\frac{x_T-x_2}{x_T-x_1} - \frac{y_T-y_2}{y_T-y_1}}{\frac{y_T-y_3}{y_T-y_1} - \frac{x_T-x_3}{x_T-x_1}} \quad (10)$$

Likewise, if the blue color B is determined to be the base color, the luminance $m_1^1$, $m_2^1$ of red color R and blue color B can be estimated based on $m_2$ and the color coordinates $(x_1, y_1)$, $(x_2, y_2)$, $(x_3, y_3)$ of the R, G, B defined in the EBU color space according to the expressions (11) and (12).

$$m_1^1 = \frac{m_3 y_1}{y_3} \times \frac{\frac{x_T-x_3}{x_T-x_2} - \frac{y_T-y_3}{y_T-y_2}}{\frac{y_T-y_1}{y_T-y_2} - \frac{x_T-x_1}{x_T-x_2}} \quad (11)$$

$$m_2^1 = \frac{m_3 y_2}{y_3} \times \frac{\frac{x_T-x_3}{x_T-x_1} - \frac{y_T-y_3}{y_T-y_1}}{\frac{y_T-y_2}{y_T-y_1} - \frac{x_T-x_2}{x_T-x_1}} \quad (12)$$

In step 215, the computer 10 estimates gray levels of the R, G, B based upon the estimated luminance of the base color, the estimated luminance of the two adjustable colors, and Gamma value in the Gamma table. The relationship between the luminance and the Gamma value is expressed as:

$$GL = 255 \times \left(\frac{m}{Y_{max}}\right)^{1/T} \quad (13)$$

In the expression (13), m indicates luminance of the two adjustable colors, $Y_{max}$ indicates max luminance of the R, G, B, such as the gray levels of the R, G, B are 255. The max luminance of the R, G, B can be experimentally determined. T indicates a predetermined Gamma value, the Gamma value is in a range from 2.0 to 2.4. In this embodiment, the gamma value is 2.2.

Based on the expression (13), luminance $GLr_1$ of R, luminance $GLg_1$ of the adjustable color G, and the luminance $GLb_1$ of adjustable color B can be obtained:

$$GLr_1 = 255 \times \left(\frac{m_1^1}{Y_{max}}\right)^{1/T} \quad (14)$$

$$GLg_1 = 255 \times \left(\frac{m_2^1}{Y_{max}}\right)^{1/T} \quad (15)$$

$$GLb_1 = 255 \times \left(\frac{m_3^1}{Y_{max}}\right)^{1/T} \quad (16)$$

Further utilizing the Gamma value can efficiently reduce quantity of measuring data needed to estimate the luminance of the two adjustable colors G, B.

In step 217, the computer 10 controls the video signal generator 30 to generate an RGB signal comprising the estimated gray levels of the R, G, B to construct an estimated white point plane on the display 20.

In step 219, the computer 10 controls the colorimeter 40 to measure the estimated color coordinates $W_c(x_c, y_c)$ of an estimated white point of the estimated white point plane.

In step 221, the computer 10 calculates an error Δxy between the target color coordinates $W_T(x_T, y_T)$ of the target white point and the estimated color coordinates $W_c(x_c, y_c)$ of the estimated white point, and determines whether the error Δxy satisfies the error requirement. The error is expressed as:

$$\Delta xy = \sqrt{(x_T + x_C)^2 + (y_T - y_C)^2} \quad (17)$$

For example, if the error Δxy is smaller than the predetermined error, the error Δxy satisfies the error requirement, while the error Δxy is greater than the predetermined error, the error does not satisfy the error requirement.

In step 223, if the error Δxy satisfies the error requirement, the computer 10 determines the estimated gray levels to be the adjusted gray levels of the two adjustable colors G, B.

In step 225, the computer constructs the Gamma table based on the adjusted gray levels of the two adjustable colors and determines whether all the plurality of the groups of the gray levels have been selected.

In step 227, if not all the plurality of the groups of the gray levels have been selected, the procedure goes back to step 203 to select a remaining one of the set groups of the gray levels until all the plurality of the groups of the gray levels have been selected and the correction table is complete.

In step 230, if the error does not satisfy the predetermined error, the computer 10 fixes the estimated gray level of the base color and adjusts the estimated gray levels of the two adjustable colors G, B to the adjusted gray levels based on measured coordinates of the two adjustable colors, the estimated coordinates of the estimated white point, and the target coordinates of the target white point, and then performs the step 230. How the computer 10 adjusts the estimated gray levels of the two adjustable colors G, B to the adjusted gray levels will be described below in following two methods.

Figure 3:
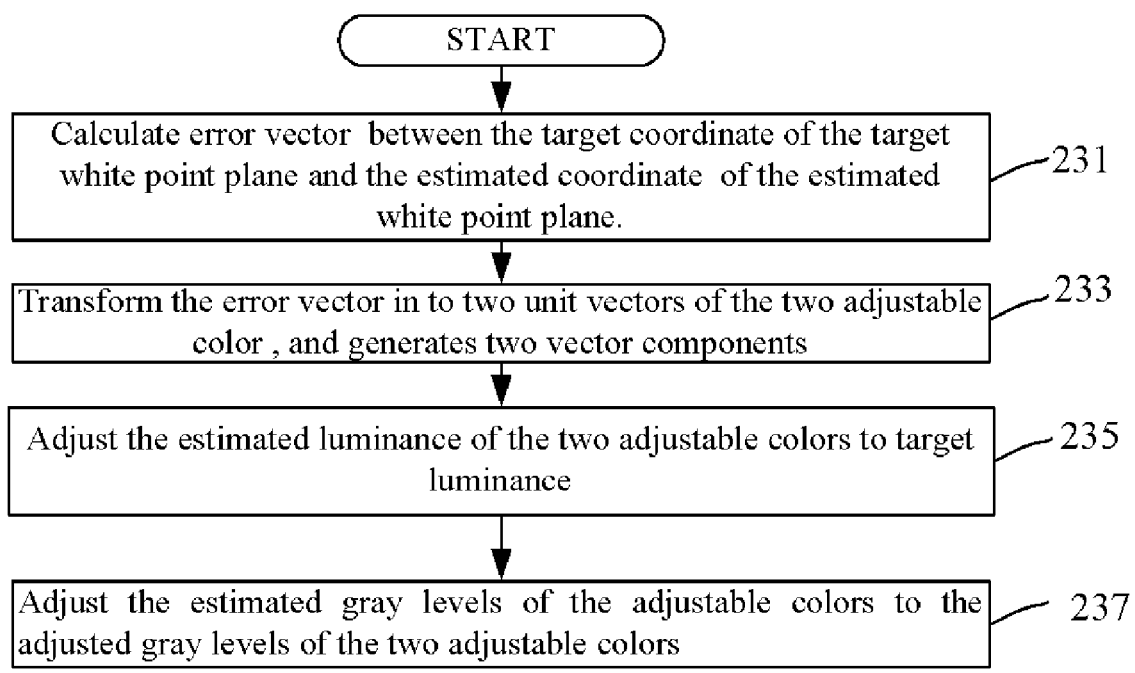
FIG. 3 illustrates a flowchart of a sub-method for the white balance correction method in FIG. 2 in accordance with a first exemplary embodiment.

Referring FIG. 3, a flowchart of a first method of adjustment of the estimated gray levels of the two adjustable colors G, B in step 230 is shown. The first method includes following steps.

Figure 5:
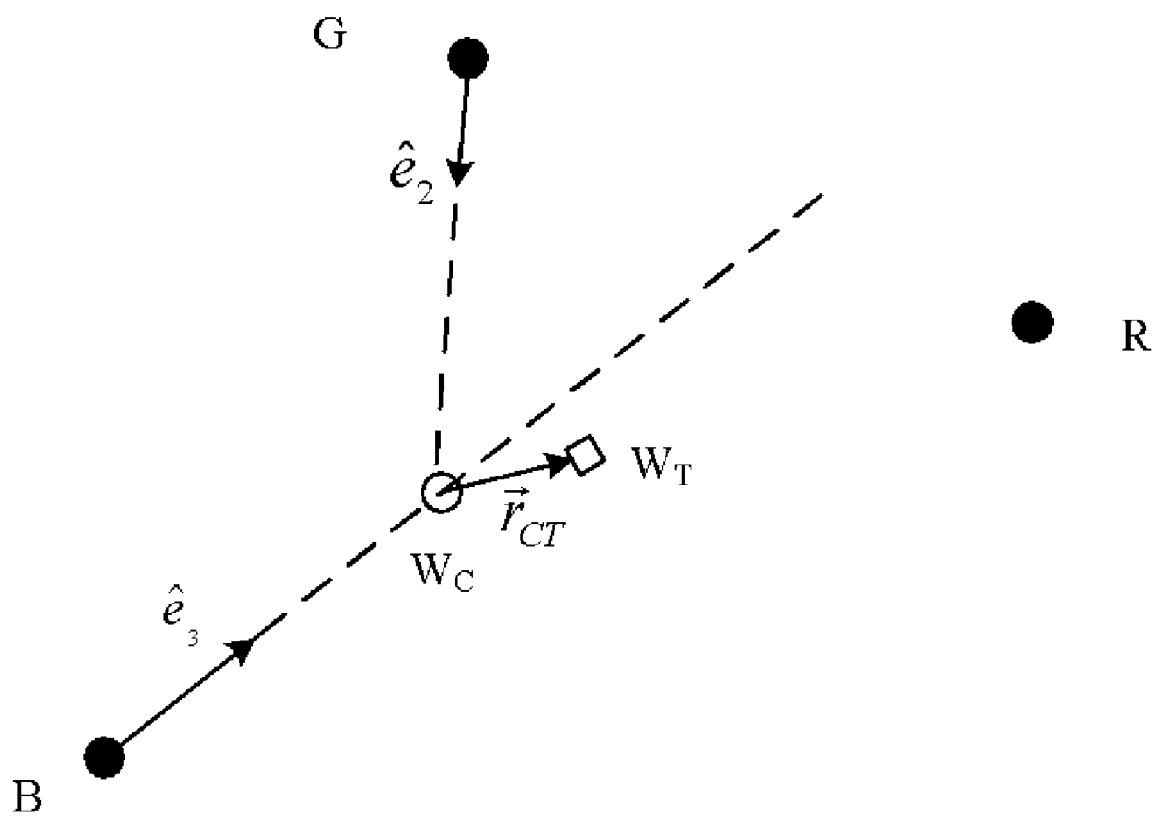
FIGS. 5 and 6 illustrate position relationship between R, G, B color coordinates, a target white point color coordinates, and an estimation of white point color coordinates in accordance with an exemplary embodiment.

In step 231, the computer 10 calculates error vector $\bar{r}_{CT}$ between the target coordinates $W_T(x_T, y_T)$ of the target white point and the estimated coordinates $W_T(x_T, y_T)$ of the estimated white point. Referring to FIG. 5, the error vector can be expressed as:

$$\bar{r}_{CT} = (x_T - x_C)\hat{i} + (y_T - y_C)\hat{j} \quad (18)$$

Figure 6:
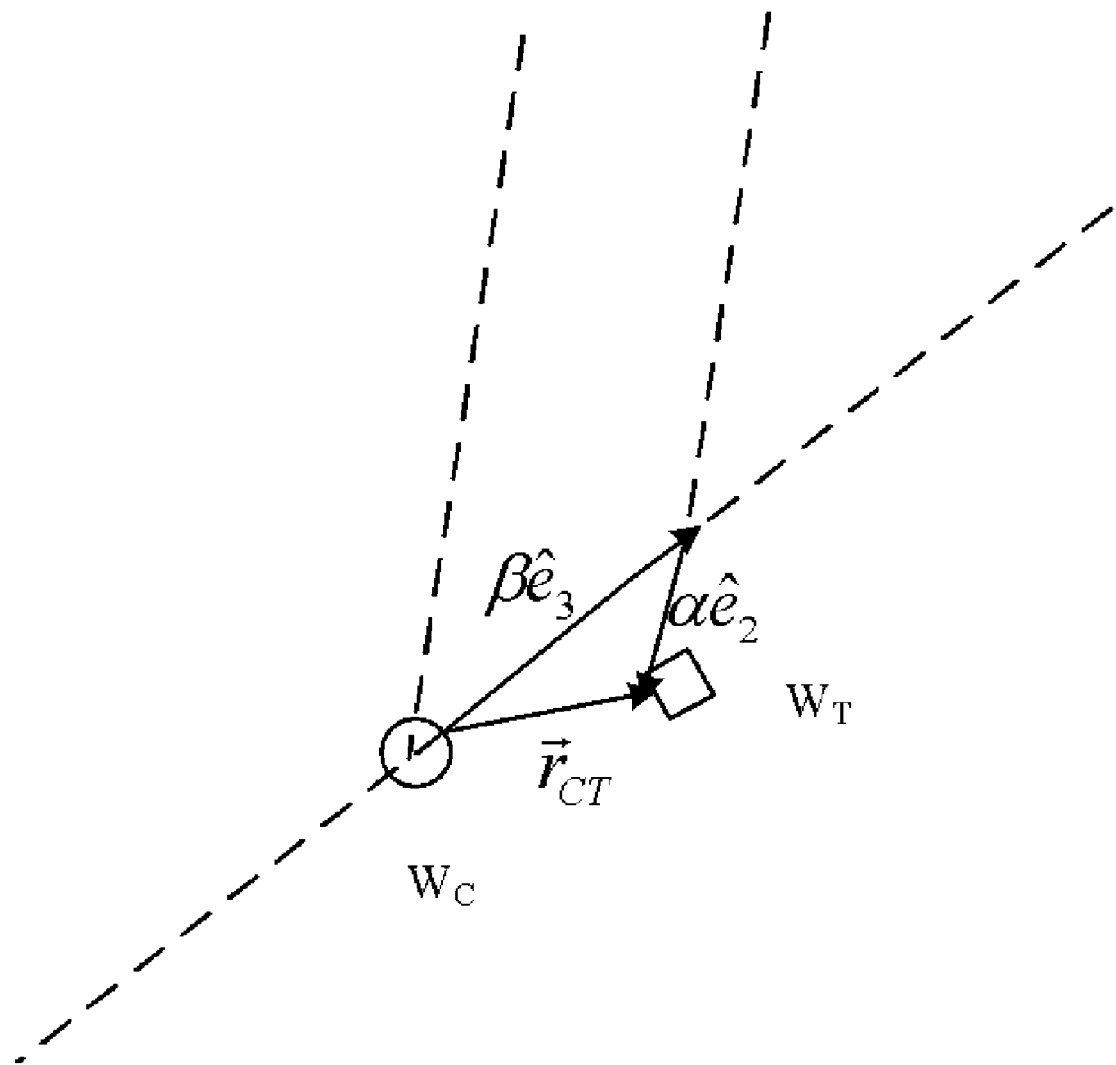

In step 233, the computer 10 transforms the error vector $\bar{r}_{CT}$ in to two unit vectors $\hat{e}_2$ and $\hat{e}_3$ of the two adjustable color by a transformation, and generates two vector components α, β of the two unit vectors $\hat{e}_2$ and $\hat{e}_3$. Referring to FIG. 6, transformation can be expressed as:

$$\bar{r}_{CT} = \alpha \hat{e}_2 + \beta \hat{e}_3 \quad (19)$$

$$\hat{e}_2 = \frac{\bar{r}_{GC}}{|\bar{r}_{GC}|}, \bar{r}_{GC} = (x_C - x_G)\hat{i} + (y_C - y_G)\hat{j} \quad (20)$$

$$\hat{e}_3 = \frac{\bar{r}_{BC}}{|\bar{r}_{BC}|}, \bar{r}_{BC} = (x_C - x_B)\hat{i} + (y_C - y_B)\hat{j} \quad (21)$$

In step 235, the computer 10 adjusts the estimated luminance of the two adjustable colors G, B to target luminance based on a relationship between the unit vectors $\hat{e}_2$ and $\hat{e}_3$ and luminance of the two adjustable colors G, B. As shown in FIGS. 5 and 6, when α or β is a plus value, the luminance of G, B must be reduced, while α or β is negative value, the luminance of the adjustable colors G, B must be increased. The adjustment of the luminance of G, B can be determined by actual experiments. For example, in the gray level 50, the luminance of B is reduced by 10%, an adjustment of a vector component of the unit vector $\hat{e}_3$ is 0.0085. When α is 0.33768, the luminance of G must be reduced by 19.8%. Further, the adjustment of the estimated luminance of G or B can be also determined by following expression (11) based on the estimated color coordinates $W_c(x_c, y_c)$ of the estimated white point, determined target luminance $m_1$, the standard R, G, B color coordinates $R(x_1, y_1)$, $G(x_2, y_2)$, $B(x_3, y_3)$. The expression is express as:

$$m_2^2 = \frac{m_1 y_2}{y_1} \times \frac{\frac{x_C - x_1}{x_C - x_3} - \frac{y_C - y_1}{y_C - y_3}}{\frac{y_C - y_2}{y_C - y_3} - \frac{x_C - x_2}{x_C - x_3}} \quad (22)$$

$$m_3^2 = \frac{m_1 y_3}{y_1} \times \frac{\frac{x_C - x_1}{x_C - x_2} - \frac{y_C - y_1}{y_C - y_2}}{\frac{y_C - y_3}{y_C - y_2} - \frac{x_C - x_3}{x_C - x_2}} \quad (23)$$

Based on the expression (11), a quantity of the adjustment of the G luminance is $m_2^1 - m_2^2$, as a result, when the quantity of the adjustment of the luminance is the unit of luminance, the quantity adjustment of the vector components of the unit vector $\hat{e}_2$ is $\alpha/m_2^1 - m_2^2$. Likewise, when a quantity of adjustment of the luminance is the unit of luminance, the quantity of adjustment of the vector components of the unit vector $\hat{e}_3$ is $\beta/m_3^1 - m_3^2$. So the target luminance of the two adjustable colors G, B can be obtained based the relationship between the luminance and the vector components α, β of the two unit vectors $\hat{e}_2$, $\hat{e}_3$ of the two adjustable colors.

In step 237, the computer 10 adjusts the estimated gray levels of the two adjustable colors G, B to the adjusted gray levels of the two adjustable colors G, B based on the target luminance of the two adjustable colors G, B according to the expression (13).

Figure 4:
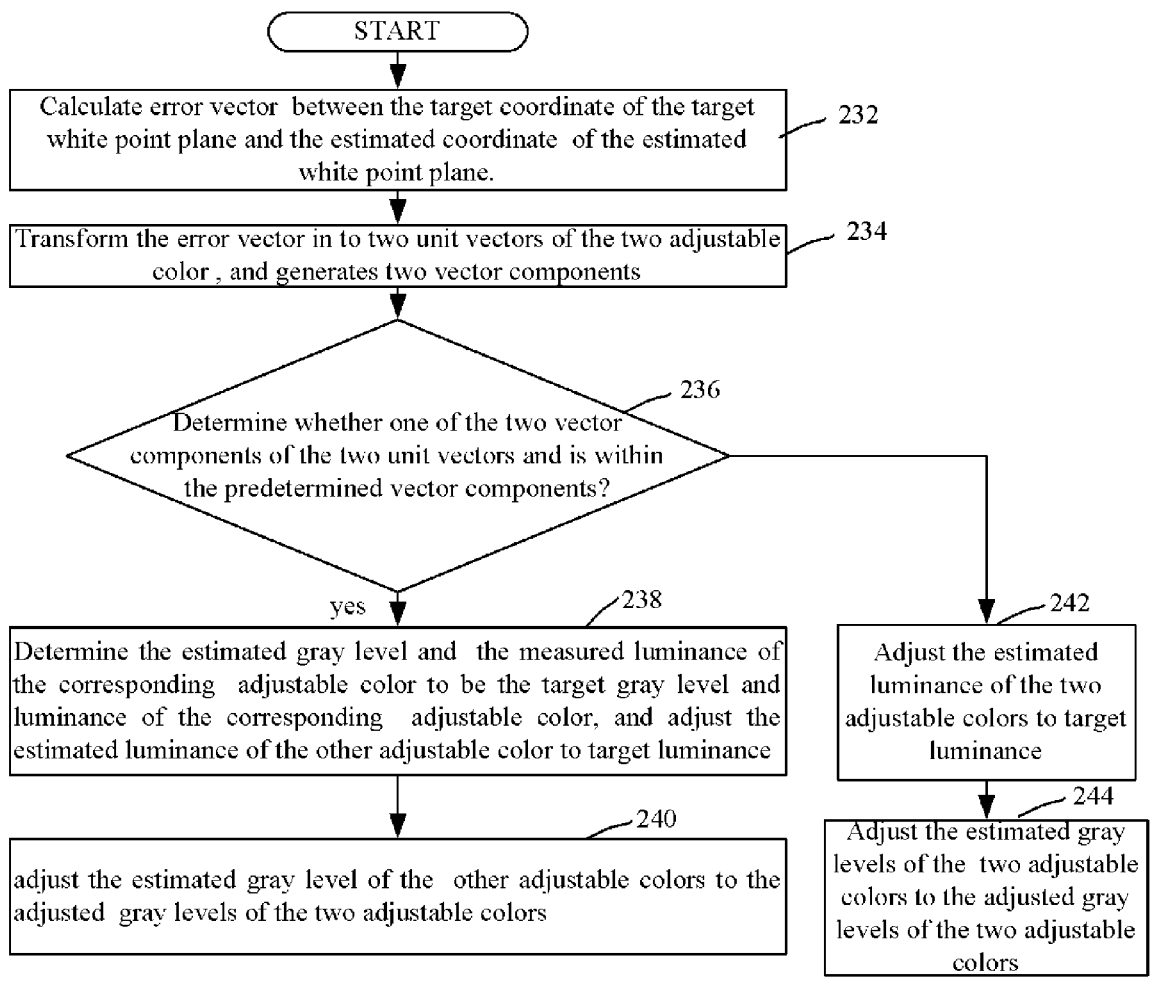
FIG. 4 illustrates a flowchart of a sub-method for the white balance correction method in FIG. 2 in accordance with a second exemplary embodiment.

Referring FIG. 4, a flowchart of a second method of adjustment of the estimated gray levels of the two adjustable colors G, B in step 230 is shown. The second method includes following steps.

In step 232, the computer 10 calculates error vector $\bar{r}_{CT}$ between the target coordinates $W_T(x_T, y_T)$ of the target white point and the estimated coordinates $W_c(x_c, y_c)$ of the estimated white point. Referring to FIG. 5, the error vector can be expressed as:

$$\bar{r}_{CT} = (x_T - x_C)\hat{i} - (y_T - y_C)\hat{j} \quad (24)$$

In step 234, the computer 10 transforms the error vector $\bar{r}_{CT}$ in to two unit vectors $\hat{e}_2$ and $\hat{e}_3$ of the two adjustable color B, G, and generates two vector components α and β of the two unit vectors $\hat{e}_2$ and $\hat{e}_3$. Referring to FIG. 6, transformation can be expressed as:

$$\bar{r}_{CT} = \alpha \hat{e}_2 + \beta \hat{e}_3 \quad (25)$$

$$\hat{e}_2 = \frac{\bar{r}_{GC}}{|\bar{r}_{GC}|}, \bar{r}_{GC} = (x_C - x_G)\hat{i} + (y_C - y_G)\hat{j} \quad (26)$$

$$\hat{e}_3 = \frac{\bar{r}_{BC}}{|\bar{r}_{BC}|}, \bar{r}_{BC} = (x_C - x_B)\hat{i} + (y_C - y_B)\hat{j} \quad (27)$$

In step 236, the computer 10 determines whether one of the two vector components α and β of the two unit vectors $\hat{e}_2$ and $\hat{e}_3$ is within a predetermined vector component.

In step 238, if one of the two vector components α and β of the two unit vectors ê₂ and ê₃ is within the predetermined vector component, the computer 10 fixes the estimated gray level of an corresponding adjustable color which corresponding to the one vector component and adjusts the estimated luminance of the other adjustable color luminance to be target luminance based on a relationship between the unit vector and luminance of the other adjustable colors. In other words, the adjustment of the corresponding adjustable color is complete, and the other adjustable color also needs to be adjusted by re-estimating its target luminance For example, if the α is within the predetermined vector component, the adjustment of the adjustable color G corresponding to the α is complete, as well the adjustment of the adjustable color B is performed by re-estimating the target luminance of the adjustable color B. How to obtain the target luminance of the other adjustable color can be seen in the step 235 above.

In step 240, the computer 10 adjusts the estimated gray level of the other adjustable color to the adjusted gray levels based on the target luminance of the other adjustable color according to the expression (13).

In step 242, if none of the two vector components α and β of the two unit vectors ê₂ and ê₃ is within the predetermined vector components, the computer 10 adjusts the estimated luminance of the two adjustable colors G, B to the target luminance. How to obtain the target luminance of the other adjustable color can be seen in the step 235 above.

In step 244, the computer 10 adjusts the estimated gray levels of the two adjustable colors G, B to the adjusted gray levels of the two adjustable colors G, B based on the target luminance of the two adjustable colors G, B according to the expression (13).

As described above, the white balance correction method can be performed by the computer, thereby reducing labor cost, and a plurality of displays of the same type can reproduce very similar or same color images. Further, the white balance correction method can be greatly simplified to correct the white balance of the display by adjusting just two colors of the R, G, B color components.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A white balance correction method for implementation by a white balance correction system, the white balance system comprising a computer, a video signal generator, a colorimeter, a video detector, and a display all under control of the computer, the display comprising a Gamma table for storing corrective action associated with relationships between input gray levels and output gray levels of the display, the video signal generator configured to generate RGB signals having pre-determined gray levels to form white color images on the display, the colorimeter configured to measure luminance and coordinates of the corresponding white color images via the video detector; the white balance correction method comprising:

setting a target color coordinates of a target white point of a target white point plane at a predetermined color temperature and a group of gray levels as the input gray levels in response to a user input command;
   constructing a white color image according to the group of the gray levels;
   measuring luminance and color coordinates of a measured white point of the white color image;
   calculating an error between the target color coordinates and the measured color coordinates;
   determined whether the error satisfies an error requirement;
   if the error does not satisfy the error requirement, estimating luminance of the R, G, B based on the standard color coordinates defined in a standard color space, the measured luminance and color coordinates of the measured white point;
   estimating gray levels of the R, G, B based on the estimated luminance of the R, G, B; and
   reconstructing the Gamma table based on the estimated adjusted gray levels of the two adjustable colors.

2. The white balance correction method of claim 1, wherein before reconstructing the Gamma table, the white balance correction method further comprises:

selecting one color of the R, G, B to be a base color and the other two colors to be adjustable colors;
   fixing the gray level of the base color and estimating the target luminance of the two adjustable colors based on the measured luminance of the base color; and
   estimating the adjusted gray levels of the two adjustable colors based on estimated luminance of the adjustable colors and the Gamma table.

3. The white balance correction method of claim 1, wherein the luminance of the R, G, B can be estimated by expressions of:

$$m_1 = \frac{lv}{k_2 + k_3 + 1}; \quad m_2 = m_1 \times k_2; \quad m_3 = m_1 \times k_3;$$

$$k_2 = \frac{y_2}{y_1} \times \frac{\frac{x-x_1}{x-x_3} - \frac{y-y_1}{y-y_3}}{\frac{y-y_2}{y-y_3} - \frac{x-x_2}{x-x_3}}; \quad k_3 = \frac{y_3}{y_1} \times \frac{\frac{x-x_1}{x-x_2} - \frac{y-y_1}{y-y_2}}{\frac{y-y_3}{y-y_2} - \frac{x-x_3}{x-x_2}}$$

wherein lv indicates the measured luminance of the white image, $(x_1, y_1)$, $(x_2, y_2)$, $(x_3, y_3)$ are the standard color coordinates of the R, G, B.

4. The white balance correction method of claim 3, wherein before reconstructing the Gamma table, the white balance correction method further comprises:

constructing an estimated white point plane based on the gray level of the base color and the estimated adjusted gray levels of the two adjustable colors;
   measuring an estimated color coordinates of an estimated white point of the estimated white point plane;
   determining whether an error between the target color coordinates and the estimated color coordinates satisfies an error requirement; and
   if the error satisfies the error requirement, performing reconstructing the Gamma table.

5. The white balance correction method of claim 4, wherein if the error does not satisfy the error requirement, calculating an error vector between the target coordinates of the target white point plane and the estimated coordinates of the estimated white point plane;
   transforming the error vector into two unit vectors of the two adjustable color, and generating two vector components;
   re-estimating the target luminance of the two adjustable colors based on the two unit vectors and the vector components; and adjusting the estimated gray levels of the two adjustable colors to the adjusted gray levels of the two adjustable colors.

6. The white balance correction method of claim 4, wherein adjusting the estimate gray levels of the two adjustable colors to target gray level comprises:
   calculating error vector between the target coordinates of the target white point plane and the estimated coordinates of the estimated white point plane;
   transforming the error vector into two unit vectors of the two adjustable color, and generates two vector components;
   determining whether one of the two vector components of the two unit vectors is within a predetermined vector component;
   if one of the two vector components is within the predetermined vector component, fixing the measured luminance of the corresponding adjustable color, and re-estimating the target luminance of the other adjustable color to target luminance; and
   adjusting the estimated gray levels of the two adjustable colors to the adjusted gray levels based on the estimated luminance of the two adjustable color.

7. The white balance correction method of claim 6, wherein the transformation between the error vector and the two unit vectors of the two adjustable colors is expressed as:

$$\bar{r}_{CT} = \alpha \hat{e}_2 + \beta \hat{e}_3;$$

$$\hat{e}_2 = \frac{\bar{r}_{GC}}{|\bar{r}_{GC}|}, \bar{r}_{GC} = (x_C - x_G)\hat{i} + (y_C - y_G)\hat{j};$$

$$\hat{e}_3 = \frac{\bar{r}_{BC}}{|\bar{r}_{BC}|}, \bar{r}_{BC} = (x_C - x_B)\hat{i} + (y_C - y_B)\hat{j};$$

wherein $\bar{r}_{CT}$ indicates the error vector, $\hat{e}_2$, $\hat{e}_3$ indicate the two unit vectors of the two adjustable colors, $\alpha$ and $\beta$ indicate the two vector components of the two unit vectors.

8. The white balance correction method of claim 7, wherein adjusting the estimated luminance of the adjustable color to target luminance can obtain based on a relationship between the unit vector and the luminance of the adjustable color, the relationship can be expressed as:

$$\alpha/m_2^1 - m_2^2 \quad m_2^2 = \frac{m_1 y_2}{y_1} \times \frac{\frac{x_C - x_1}{x_C - x_3} - \frac{y_C - y_1}{y_C - y_3}}{\frac{y_C - y_2}{y_C - y_3} - \frac{x_C - x_2}{x_C - x_3}},$$

wherein $m_2^2$ indicates the estimated luminance of the adjusted color, $m_2$ indicates actual luminance of the estimated white point, $\alpha/m_2^1 - m_2^2$ indicates a quantity adjustment of the vector component of the adjustable color when the quantity adjustment of the luminance is the unit of the luminance.

9. A white balance correction method for adjusting the white balance of the display, the display comprising a Gamma table for storing corrective action associated with relationships between input gray levels and output gray levels of the display, the white balance correction method comprising:
   setting a target color coordinates of a target white point of a target white point plane at a predetermined color temperature and a group of gray levels as the input gray levels in response to a user input command;
   constructing a white color image according to the group of the gray levels;
   measuring luminance and color coordinates of a measured white point of the white color image;
   calculating an error between the target color coordinates and the measured color coordinates;
   determined whether the error satisfies an error requirement;
   if the error does not satisfy the error requirement, estimating luminance of the R, G, B based on the standard color coordinates defined in a standard color space, the measured luminance and color coordinates of the measured white point;
   estimating gray levels of the R, G, B based on the estimated luminance of the R, G, B; and
   reconstructing the Gamma table based on the estimated adjusted gray levels of the two adjustable colors.

10. The white balance correction method of claim 9, wherein before reconstructing the Gamma table, the white balance correction method further comprises:
    selecting one color of the R, G, B to be a base color and the other two colors to be adjustable colors;
    fixing the gray level of the base color and estimating the target luminance of the two adjustable colors based on the measured luminance of the base color; and
    estimating the adjusted gray levels of the two adjustable colors based on estimated luminance of the adjustable colors and the Gamma table.

11. The white balance correction method of claim 9, wherein the luminance of the R, G, B can be estimated by expressions of:

$$m_1 = \frac{lv}{k_2 + k_3 + 1}; \quad m_2 = m_1 \times k_2; \quad m_3 = m_1 \times k_3;$$

$$k_2 = \frac{y_2}{y_1} \times \frac{\frac{x-x_1}{x-x_3} - \frac{y-y_1}{y-y_3}}{\frac{y-y_2}{y-y_3} - \frac{x-x_2}{x-x_3}}; \quad k_3 = \frac{y_3}{y_1} \times \frac{\frac{x-x_1}{x-x_2} - \frac{y-y_1}{y-y_2}}{\frac{y-y_3}{y-y_2} - \frac{x-x_3}{x-x_2}}$$

wherein lv indicates the measured luminance of the white image, $(x_1, y_1)$, $(x_2, y_2)$, $(x_3, y_3)$ are the standard color coordinates of the R, G, B.

12. The white balance correction method of claim 11, wherein before reconstructing the Gamma table, the white balance correction method further comprises:
    constructing an estimated white point plane based on the gray level of the base color and the estimated adjusted gray levels of the two adjustable colors;
    measuring an estimated color coordinates of an estimated white point of the estimated white point plane;
    determining whether an error between the target color coordinates and the estimated color coordinates satisfies an error requirement; and
    if the error satisfies the error requirement, performing reconstructing the Gamma table.

13. The white balance correction method of claim 12, wherein if the error does not satisfy the error requirement,
    calculating an error vector between the target coordinates of the target white point plane and the estimated coordinates of the estimated white point plane;
    transforming the error vector into two unit vectors of the two adjustable color, and generating two vector components;

re-estimating the target luminance of the two adjustable colors based on the two unit vectors and the vector components; and adjusting the estimated gray levels of the two adjustable colors to the adjusted gray levels of the two adjustable colors.

14. The white balance correction method of claim 12, wherein adjusting the estimate gray levels of the two adjustable colors to target gray level comprises:

calculating error vector between the target coordinates of the target white point plane and the estimated coordinates of the estimated white point plane;

transforming the error vector into two unit vectors of the two adjustable color, and generates two vector components;

determining whether one of the two vector components of the two unit vectors is within a predetermined vector component;

if one of the two vector components is within the predetermined vector component, fixing the measured luminance of the corresponding adjustable color, and re-estimating the target luminance of the other adjustable color to target luminance; and adjusting the estimated gray levels of the two adjustable colors to the adjusted gray levels based on the estimated luminance of the two adjustable color.

15. The white balance correction method of claim 14, wherein the transformation between the error vector and the two unit vectors of the two adjustable colors is expressed as:

$$\bar{r}_{CT} = \alpha \hat{e}_2 + \beta \hat{e}_3;$$

$$\hat{e}_2 = \frac{\bar{r}_{GC}}{|\bar{r}_{GC}|}, \bar{r}_{GC} = (x_C - x_G)\hat{i} + (y_C - y_G)\hat{j};$$

$$\hat{e}_3 = \frac{\bar{r}_{BC}}{|\bar{r}_{BC}|}, \bar{r}_{BC} = (x_C - x_B)\hat{i} + (y_C - y_B)\hat{j};$$

wherein $\bar{r}_{CT}$ indicates the error vector, $\hat{e}_2$, $\hat{e}_3$ indicate the two unit vectors of the two adjustable colors, $\alpha$ and $\beta$ indicate the two vector components of the two unit vectors.

16. The white balance correction method of claim 15, wherein adjusting the estimated luminance of the adjustable color to target luminance can obtain based on a relationship between the unit vector and the luminance of the adjustable color, the relationship can be expressed as:

$$\alpha/m_2^1 - m_2^2 \quad m_2^2 = \frac{m_1 y_2}{y_1} \times \frac{\frac{x_C - x_1}{x_C - x_3} - \frac{y_C - y_1}{y_C - y_3}}{\frac{y_C - y_2}{y_C - y_3} - \frac{x_C - x_2}{x_C - x_3}},$$

wherein $m_2^2$ indicates the estimated luminance of the adjusted color, $m_2^1$ indicates actual luminance of the estimated white point, $\alpha/m_2^1 - m_2^2$ indicates a quantity adjustment of the vector component of the adjustable color when the quantity adjustment of the luminance is the unit of the luminance.

17. A white balance correction method for adjusting the white balance of the display, the display comprising a Gamma table for storing corrective action associated with relationships between input gray levels and output gray levels of the display, the white balance correction method comprising:

setting a target color coordinates of a target white point of a target white point plane at a predetermined color temperature and a group of gray levels as the input gray levels in response to a user input command;

constructing a white color image according to the group of the gray levels;

measuring luminance and color coordinates of a measured white point of the white color image;

estimating luminance of the R, G, B based on the standard color coordinates defined in a standard color space, the measured luminance and color coordinates of the measured white point;

estimating gray levels of the R, G, B based on the estimated luminance of the R, G, B; and selecting one color of the R, G, B to be a base color and the other two colors to be adjustable colors;

fixing the gray level of the base color and estimating the target luminance of the two adjustable colors based on the measured luminance of the base color;

estimating the adjusted gray levels of the two adjustable colors based on estimated luminance of the adjustable colors and the Gamma table; and reconstructing the Gamma table based on the estimated adjusted gray levels of the two adjustable colors.

18. The white balance correction method of claim 17, wherein the luminance of the R, G, B can be estimated by expressions of:

$$m_1 = \frac{lv}{k_2 + k_3 + 1}; \quad m_2 = m_1 \times k_2; \quad m_3 = m_1 \times k_3;$$

$$k_2 = \frac{y_2}{y_1} \times \frac{\frac{x - x_1}{x - x_3} - \frac{y - y_1}{y - y_3}}{\frac{y - y_2}{y - y_3} - \frac{x - x_2}{x - x_3}}; \quad k_3 = \frac{y_3}{y_1} \times \frac{\frac{x - x_1}{x - x_2} - \frac{y - y_1}{y - y_2}}{\frac{y - y_3}{y - y_2} - \frac{x - x_3}{x - x_2}}$$

wherein lv indicates the measured luminance of the white image, $(x_1, y_1)$, $(x_2, y_2)$, $(x_3, y_3)$ are the standard color coordinates of the R, G, B.

* * * * *